US012602857B2

(12) United States Patent　　　　　(10) Patent No.:　US 12,602,857 B2
Deng et al.　　　　　　　　　　　　　(45) Date of Patent:　　Apr. 14, 2026

(54) GENERATING IMAGE DATA

(71) Applicant: QUALCOMM Incorporated, San Diego, CA (US)

(72) Inventors: Yan Deng, La Jolla, CA (US); Michel Adib Sarkis, San Diego, CA (US); Chieh-Ming Kuo, Taoyuan (TW); Ze Zhang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 18/596,505

(22) Filed: Mar. 5, 2024

(65) Prior Publication Data

US 2025/0285356 A1　　　Sep. 11, 2025

(51) Int. Cl.
　　*G06T 15/04*　　　(2011.01)
　　*G06V 10/44*　　　(2022.01)
　　*G06V 10/80*　　　(2022.01)
　　*H04N 13/117*　　　(2018.01)
(52) U.S. Cl.
　　CPC .............. *G06T 15/04* (2013.01); *G06V 10/44* (2022.01); *G06V 10/806* (2022.01); *H04N 13/117* (2018.05)
(58) Field of Classification Search
　　CPC ...... G06T 15/04; G06V 10/44; G06V 10/806; H04N 13/117
　　See application file for complete search history.

(56) References Cited

U.S. PATENT DOCUMENTS

2012/0313937 A1\*　12/2012　Beeler ..................... G06T 19/00
　　　　　　　　　　　　　　　　　　345/419
2022/0377300 A1\*　11/2022　Shi ............................ G06F 3/14
2024/0412432 A1\*　12/2024　Chung .................. G06T 11/001

OTHER PUBLICATIONS

Doshi et al., FHP: Facial and Hair Feature Processor for Hairstyle Recommendation, 2022 IEEE Fourth International Conference on Advances in Electronics, Computers and Communications (ICAECC), 4 pages. (Year: 2022).\*

\* cited by examiner

*Primary Examiner* — Haixia Du
(74) *Attorney, Agent, or Firm* — Polsinelli LLP/QUALCOMM Incorporated

(57)　　　　　ABSTRACT

Systems and techniques are described herein for generating image data. For instance, a method for generating image data is provided. The method may include selecting enrollment images from among a plurality of enrollment images of a subject based on a target viewing angle, wherein each enrollment image of the plurality of enrollment images represents the subject as viewed from a different respective viewing angle; determining, from the selected enrollment images, appearance features representing at least one characteristic of the subject in the selected enrollment images; combining the appearance features based on a three-dimensional geometry of the subject to generate combined appearance features; and generating an image of the subject from the target viewing angle based on a texture image of the subject and the combined appearance features.

18 Claims, 13 Drawing Sheets

Bald Head Plus Hair 204

206

Synthesized Image 208

Bald Head 202

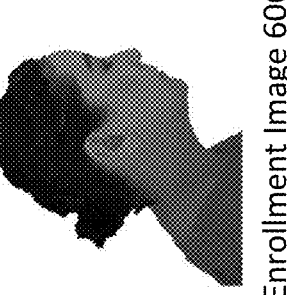
Enrollment Image 606
Enrollment Image 604
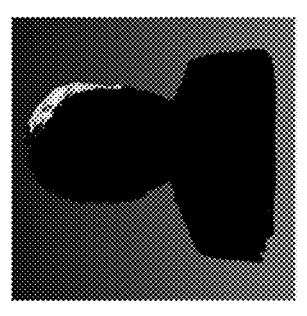
Vertex Image 612
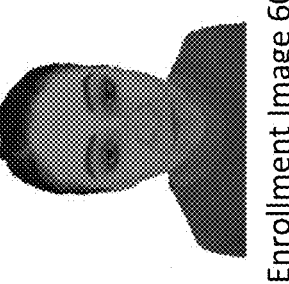
Enrollment Image 602
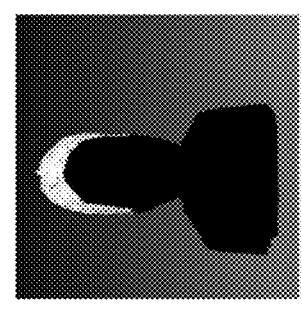
Vertex Image 610
Vertex Image 614
FIG. 6

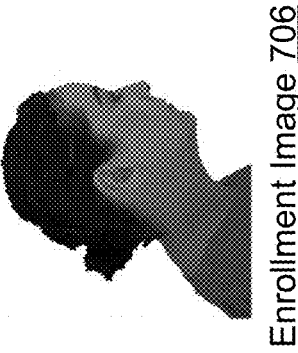
Enrollment Image 706
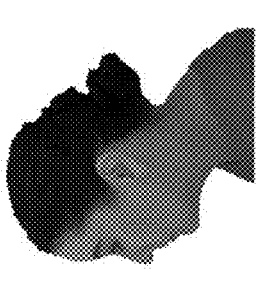
Enrollment Image 704
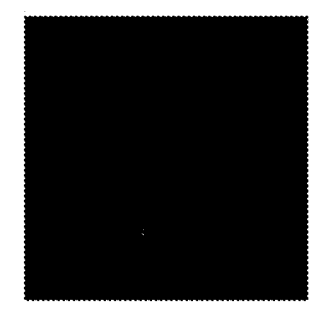
Mask 714
Mask 712
FIG. 7
Enrollment Image 702
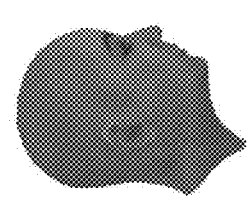
Image 708
Mask 710

Synthesized Image 906

Target Hair 904

Source Head 902

Figure 10:
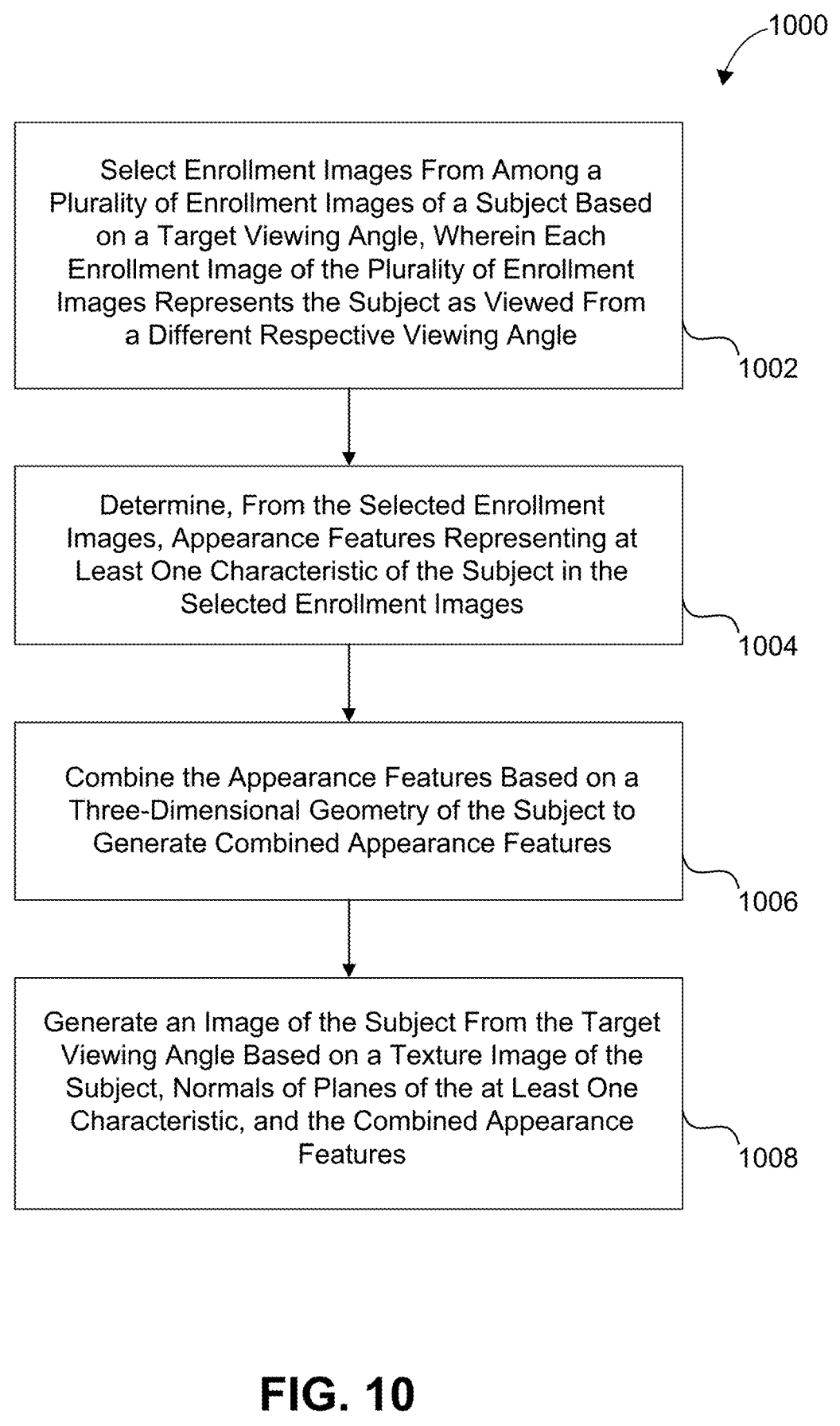

1000

Select Enrollment Images From Among a Plurality of Enrollment Images of a Subject Based on a Target Viewing Angle, Wherein Each Enrollment Image of the Plurality of Enrollment Images Represents the Subject as Viewed From a Different Respective Viewing Angle

1002

Determine, From the Selected Enrollment Images, Appearance Features Representing at Least One Characteristic of the Subject in the Selected Enrollment Images

1004

Combine the Appearance Features Based on a Three-Dimensional Geometry of the Subject to Generate Combined Appearance Features

1006

Generate an Image of the Subject From the Target Viewing Angle Based on a Texture Image of the Subject, Normals of Planes of the at Least One Characteristic, and the Combined Appearance Features

GENERATING IMAGE DATA

TECHNICAL FIELD

The present disclosure generally relates to generating image data. For example, aspects of the present disclosure include systems and techniques for generating images of a subject from new viewing angles based on enrollment images of the subject.

BACKGROUND

Some techniques generate images of a subject from novel viewing angles. Such techniques may generate the images based on enrollment images of the subject captured from a number of different viewing angles. For example, a three-dimensional (3D) morphable model (3DMM) generator may generate a 3DMM of a head of a person based on enrollment images of the person. A rasterizer may be used to render a two-dimensional (2D) images of the 3DMM from a target viewing angle. Generating images of heads may be useful to generate avatars representative of people, for example, for virtual interactions, such as virtual meetings, virtual reality (VR) interactions, gaming, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for generating image data. According to at least one example, a method is provided for generating image data. The method includes: selecting enrollment images from among a plurality of enrollment images of a subject based on a target viewing angle, wherein each enrollment image of the plurality of enrollment images represents the subject as viewed from a different respective viewing angle; determining, from the selected enrollment images, appearance features representing at least one characteristic of the subject in the selected enrollment images; combining the appearance features based on a three-dimensional geometry of the subject to generate combined appearance features; and generating an image of the subject from the target viewing angle based on a texture image of the subject and the combined appearance features.

In another example, an apparatus for generating image data is provided that includes at least one memory and at least one processor (e.g., configured in circuitry) coupled to the at least one memory. The at least one processor configured to: select enrollment images from among a plurality of enrollment images of a subject based on a target viewing angle, wherein each enrollment image of the plurality of enrollment images represents the subject as viewed from a different respective viewing angle; determine, from the selected enrollment images, appearance features representing at least one characteristic of the subject in the selected enrollment images; combine the appearance features based on a three-dimensional geometry of the subject to generate combined appearance features; and generate an image of the subject from the target viewing angle based on a texture image of the subject and the combined appearance features.

In another example, a non-transitory computer-readable medium is provided that has stored thereon instructions that, when executed by one or more processors, cause the one or more processors to: select enrollment images from among a plurality of enrollment images of a subject based on a target viewing angle, wherein each enrollment image of the plurality of enrollment images represents the subject as viewed from a different respective viewing angle; determine, from the selected enrollment images, appearance features representing at least one characteristic of the subject in the selected enrollment images; combine the appearance features based on a three-dimensional geometry of the subject to generate combined appearance features; and generate an image of the subject from the target viewing angle based on a texture image of the subject and the combined appearance features.

In another example, an apparatus for generating image data is provided. The apparatus includes: means for selecting enrollment images from among a plurality of enrollment images of a subject based on a target viewing angle, wherein each enrollment image of the plurality of enrollment images represents the subject as viewed from a different respective viewing angle; means for determining, from the selected enrollment images, appearance features representing at least one characteristic of the subject in the selected enrollment images; means for combining the appearance features based on a three-dimensional geometry of the subject to generate combined appearance features; and means for generating an image of the subject from the target viewing angle based on a texture image of the subject and the combined appearance features.

In some aspects, one or more of the apparatuses described herein is, can be part of, or can include an extended reality device (e.g., a virtual reality (VR) device, an augmented reality (AR) device, or a mixed reality (MR) device), a vehicle (or a computing device, system, or component of a vehicle), a mobile device (e.g., a mobile telephone or so-called "smart phone", a tablet computer, or other type of mobile device), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIG. 6 includes several images to illustrate operations of selective mask of FIG. 4 and FIG. 5, according to various aspects of the present disclosure;

FIG. 7 includes several images and corresponding masks to illustrate operations of selective mask of FIG. 4 and FIG. 5, according to various aspects of the present disclosure;

FIG. 10 is a flow diagram illustrating a process for generating image data, in accordance with aspects of the present disclosure;

DETAILED DESCRIPTION

Figure 1:
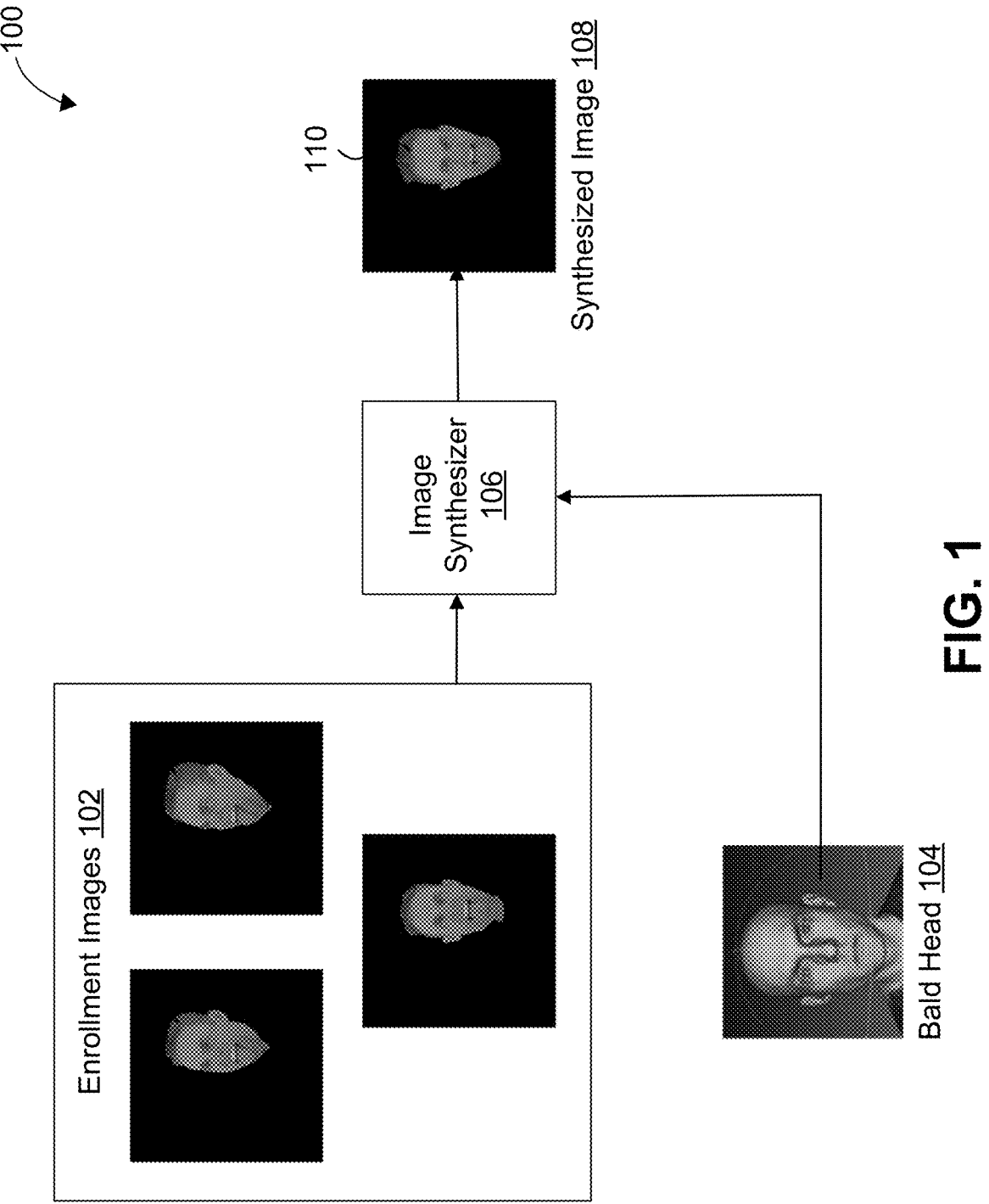
FIG. 1 is a diagram illustrating a system for generating a synthesized image, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As described above, some techniques generate images of a subject from a target viewing angle based on enrollment images of the subject. To accomplish this, some techniques generate three-dimensional (3D) morphable models (3DMMs) of subjects, then rasterize two-dimensional (2D) images of the 3DMMs based on the target viewing angle.

Hair of a head of a person is difficult to accurately model in 3D based on images. Some techniques generate a 3DMM of a head of a person, absent hair. Such 3DMMs may represent a face of the person on a bald head or an incomplete head. Such techniques may also render a 3DMM of hair of the person then merge the 3DMMs. Such techniques may leave holes between the hair 3DMM and the head 3DMM.

Systems, apparatuses, methods (also referred to as processes), and computer-readable media (collectively referred to herein as "systems and techniques") are described herein for generating image data. The systems and techniques may obtain enrollment images of a subject. For example, the systems and techniques may obtain several (e.g., five) images of the subject, each captured from a different viewing angle. Further, the systems and techniques may obtain segmentation masks of the enrollment images. The segmentation masks may indicate which portions of the enrollment images represent a characteristic of the subject. For example, the systems and techniques may obtain five images of a head of a person; each of the images may be captured from a different viewing angle. Further, the systems and techniques may obtain a hair mask indicating which pixels of each of the enrollment images represent hair of the subject.

The systems and techniques may select enrollment images from among the several enrollment images based on a target viewing angle. For example, the systems and techniques may select the selected enrollment images based on a relationship (e.g., a similarity) between respective viewing angles of the selected enrollment images and the target viewing angle.

The systems and techniques may determine appearance codes of the characteristic of the subject as the characteristic appears in the selected enrollment images. The appearance codes may be, or may include, one or more features in a latent feature space. For example, the systems and techniques may generate the features by processing the selected enrollment images using a machine-learning model. The systems and techniques may use the segmentation masks to select the features of the characteristic. For example, the systems and techniques may use a machine-learning model to determine an appearance code for the hair of the subject based on the selected enrollment images and the segmentation masks indicative of the hair within the enrollment images.

Additionally, the systems and techniques may use a selective mask to selectively combine appearance codes from the different enrollment images to generate a feature set that is relevant to the target viewing angle. For example, the selective mask may receive a three-dimensional model of the characteristic of the subject, a texture image of the subject as if captured from the target viewing angle absent the characteristic, a characteristic mask indicative of the pixels in the texture image that would be occupied by the characteristic if the characteristic were present in the texture image, and characteristic normals including normals of planes of a 3DMM of the characteristic. The texture image may be a rasterization of a 3DMM of the subject (e.g., a head of a person). The texture image may be of the subject (absent a characteristic of the subject, such as, absent hair) as if viewed from a target viewing angle. The characteristic mask may indicate where the hair would be on the head of the person in the texture image, if the head included hair in the texture image. The characteristic normals may include normals of planes of a 3DMM of the characteristic. For example, the characteristic normals may include vectors perpendicular to planes of a 3DMM of the hair of the person. The characteristic mask and the characteristic normal may be based on a 3DMM of the hair of the person.

The selective mask may generate selected masks that may indicate portions of the enrollment images that are relevant to the target viewing angle based on the three-dimensional model, the texture image, the characteristic mask, and the characteristic normals. The systems and techniques may combine (e.g., fuse, such as using a machine-learning model) the appearance codes based on the selected masks to generate the feature set.

Further, the systems and techniques may generate a synthesized image based on the texture image and the feature set. For example, the systems and techniques may use a machine-learning model to generate the synthesized image based on feature set, the texture image, the characteristic mask, and the characteristic normal.

The systems and techniques may generate images of subjects and characteristics that may be more aesthetically pleasing than images generated by other techniques. For example, the systems and techniques may generate images without holes between subjects and characteristics of the subjects whereas other techniques may generate images with holes between subjects and characteristics of the subjects.

Various aspects of the application will be described with respect to the figures below.

FIG. 1 is a diagram illustrating a system 100 for generating a synthesized image 108, according to various aspects of the present disclosure. For example, given a rendering texture image (e.g., face only, such as bald head 104) and multi-view enroll data (such as enrollment images 102), image synthesizer 106 may synthesize personalized, multi-view consistent hair on top of the rendering texture image. For example, image synthesizer 106 may generate synthesized image 108, which may include bald head 104 with personalized, multi-view consistent hair 110 on top of bald head 104, based on enrollment images 102 and bald head 104.

Accordingly, system 100 may be a multi-view consistency hair synthesis framework. System 100 may, for a given user, obtain multiple (e.g., five) enrollment images 102 of the user. Hair segmentation may be extracted for the multi-view images. For each of enrollment images 102, a particle CNN network may extract appearance features. A 3D geometry, which may be obtained from a geometry network, may be used to guide the fusion of the appearance features. Then, bald head 104, normal of the hair, and the fused appearance features may be fed into a machine-learning model to synthesize hair 110 on top of bald head 104.

Figure 2:
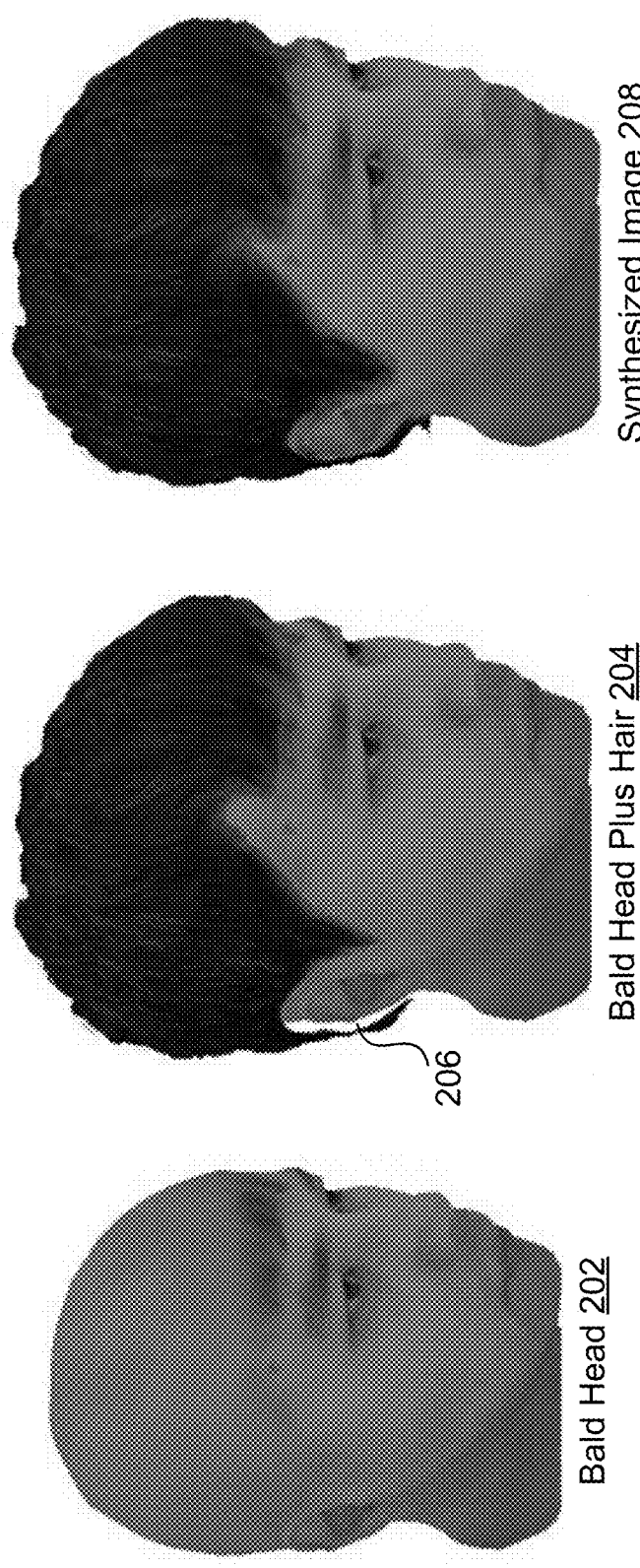
FIG. 2 includes three generated images of a subject to illustrate various concepts related to the present disclosure.

FIG. 2 includes three generated images of a subject to illustrate various concepts related to the present disclosure. Bald head 202 is an image of a person generated without hair. Bald head 202 may be generated (e.g., rasterized) based a three-dimensional (3D) morphable model (3DMM) using enrollment images of the person. The 3DMM can be generated using a 3D model fitting technique (e.g., a 3DMM fitting technique). In some aspects, the 3DMM can be a statistical model representing 3D geometry of an object (e.g., the bald head 202). In some cases, the 3DMM of the bald head 202 can be represented by a linear combination of a mean face $S_0$ with basis terms (also referred to as basis vectors) for facial shape $U_i$ and facial expressions $V_j$ with coefficients for facial shape $a_i$ and facial expressions $b_j$, for example, as follows (where the 3DMM is denoted as S):

$$S = S_0 + \sum_{i=1}^{M} a_i \cdot U_i + \sum_{j=1}^{N} b_j \cdot V_j$$

In the example of Equation (1), there are M facial shape coefficients $a_i$ and M facial shape basis vectors $U_i$ where M is an integer greater than or equal to 1. In some implementations, each of the mean face $S_0$, facial shape basis vectors $U_i$, and facial expression vectors $V_j$ can include position information for 3D vertices (e.g., x, y, and z coordinates) that can be combined to form the 3D model S. In some implementations, facial shape basis vectors $U_i$, and facial expression vectors $V_j$ can be expressed as positional offsets from the mean face $S_0$, where the coefficients for facial shape $a_i$ and facial expressions $b_j$ provide a scaling factor for corresponding offset vectors. In one illustrative example, the 3D model S includes three thousand 3D vertices and M is equal to 219 (corresponding to 219 facial shape basis vectors $U_i$ and facial shape coefficients $a_i$). In some implementations, the shape basis vectors $U_i$ can include principal component analysis eigenvectors. In some cases, there are N facial expression coefficients $b_j$ and N facial expression basis vectors where N is an integer greater than or equal to 1. In some cases, the facial expression vectors $V_j$ can include blendshape vectors.

Bald head with hair 204 may be generated (e.g., rasterized) based on the 3DMM used to generate bald head 202 and a 3DMM of hair of the person. Bald head with hair 204 includes hole 206 between the 3DMM of bald head 202 and the 3DMM of the hair. Synthesized image 208 is an example of an image synthesized according to various aspects of the present disclosure. Synthesized image 208 does not include a hole between the hair and the head of the subject.

Figure 3:
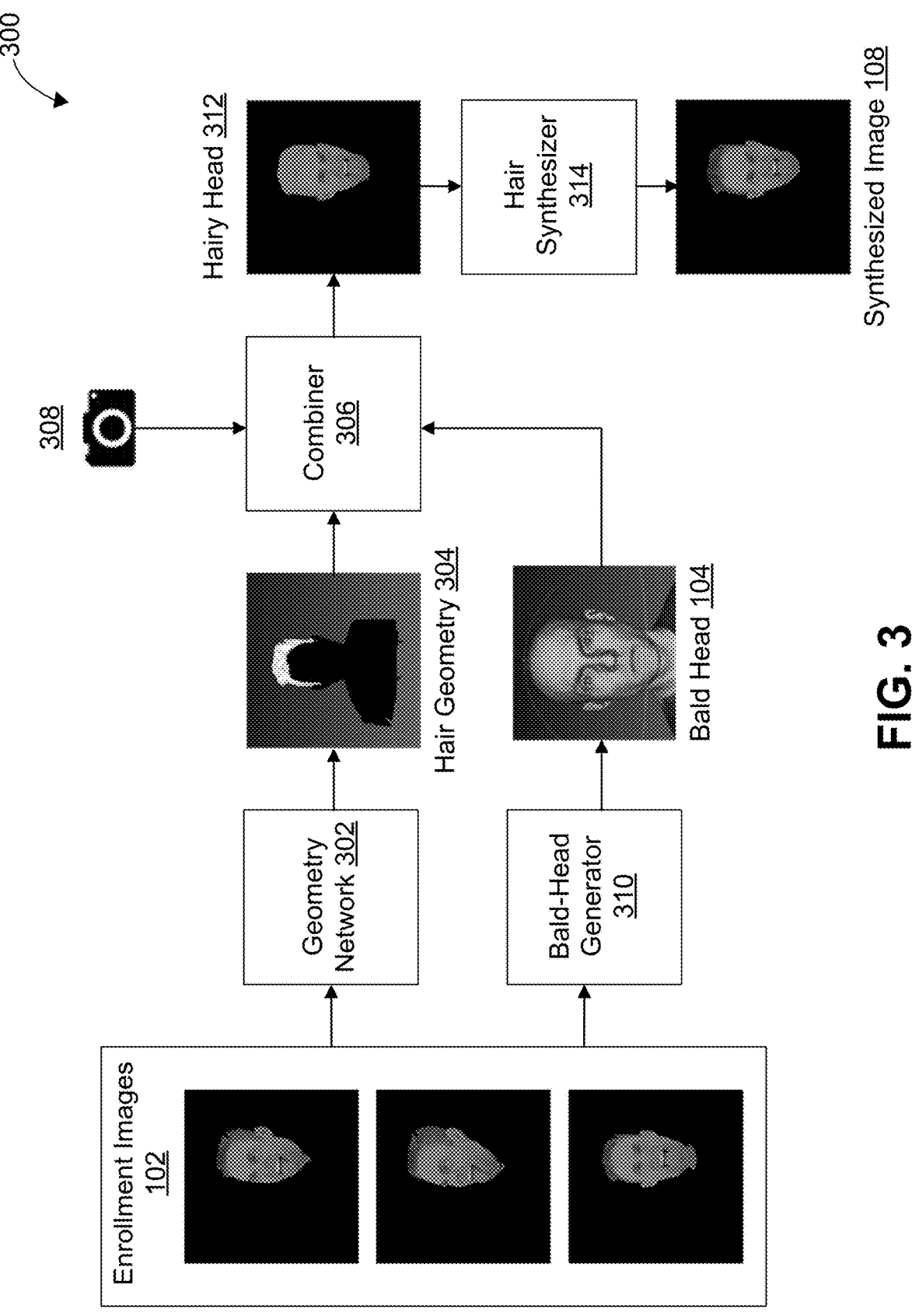
FIG. 3 is a diagram of an example system that may be used to generate synthesized image, according to various aspects of the present disclosure.

FIG. 3 is a diagram of an example system 300 that may be used to generate synthesized image 108, according to various aspects of the present disclosure. System 300 may obtain enrollment images 102, geometry network 302 may generate hair geometry 304 based on enrollment images 102, system 300 may obtain bald head 104 and target viewing angle 308, combiner 306 may generate hairy head 312 based on hair geometry 304, bald head 104, and target viewing angle 308, and hair synthesizer 314 may generate synthesized image 108 based on hairy head 312.

Enrollment images 102 may be, or may include, a number of images of a subject (e.g., a head of a person) captured from a number of respective viewing angles. Enrollment images 102 may include any number of images captured from any number of respective viewing angles. For example, enrollment images 102 may include five images captured from five respective viewing angles. Enrollment images 102 may all be of the same person. System 300 may be used to personalize synthesized image 108. In some aspects, system 300 may select enrollment images 102 from a larger set of enrollment images (not illustrated in FIG. 3) based on a target viewing angle 308. For example, system 300 may select enrollment images 102 from among the larger set of images based on the viewing angle from which enrollment images 102 were captured being similar to target viewing angle 308.

Geometry network 302 may generate hair geometry 304 based on enrollment images 102. Geometry network 302 may be, or may include, one or more machine-learning models trained to generate personalized hair geometry based on enrollment images. Hair geometry 304 may include a 3D model of hair of the person represented by enrollment images 102. For example, hair geometry 304 may be, or may include, a 3DMM of the hair of the person of enrollment images 102. Further, hair geometry 304 may include semantic labels. For example, points of the 3DMM may be semantically labeled as hair.

Bald-head generator 310 may generate bald head 104 based on enrollment images 102. Bald-head generator 310 may be, or may include, one or more machine-learning models trained to generate personalized bald heads based on enrollment images. Bald head 104 may include a three-dimensional model of a head of the person represented by enrollment images 102. For example, bald head 104 may be, or may include, a 3DMM of a head of the person of enrollment images 102, absent hair.

Target viewing angle 308 may be a viewing angle from which synthesized image 108 is to be rendered. For example, target viewing angle 308 may include coordinates (e.g., relative coordinate) describing a location relative to the head of the person of enrollment images 102 from which synthesized image 108 should appear to be captured.

Combiner 306 may generate hairy head 312 based on hair geometry 304, bald head 104, and target viewing angle 308. Combiner 306 may combine (e.g., fuse) hair geometry 304 and bald head 104. In some aspects, combiner 306 may perform operations related to collision detection and/or dilation. For example, in some cases, bald head 104 may intersect with hair geometry 304. To prevent improper intersections between bald head 104 and hair geometry 304, combiner 306 may dilate a hair mask to cause a skull region (e.g., of bald head 104) to be under a hair region (e.g., of hair geometry 304).

A dilation operation can be used to enhance a boundary of an object in an image or frame (e.g., hair in hair geometry 304). For example, a morphology engine can apply a dilation function (e.g., FilterDilate3×3) to a 3×3 filter window of a center pixel. The 3×3 dilation window can be applied to each pixel (as the center pixel) in an image. One of ordinary skill in the art will appreciate that other window sizes can be used other than a 3×3 window. The dilation function can include a dilation operation that sets a current pixel in the image (acting as the center pixel) to a particular value if one or more of its neighboring pixels in the 3×3 window have the same value (e.g., a value indicating the pixel is a pixel corresponding to hair, such as a value of 1 in a binary mask). The neighboring pixels of the current center pixel include the eight pixels in the 3×3 window, with the ninth pixel being the current center pixel.

Hairy head 312 may be, or may include, a 3D model of a head of the person of enrollment images 102 based on bald head 104 and hair geometry 304. Additionally or alternatively, hairy head 312 may include a 2D image of the head of the person of enrollment images 102 as viewed from target viewing angle 308. Hairy head 312 may lack hair texture. For example, hairy head 312 may include hair, but the hair may be based on hair geometry 304 without detailed texture information.

Hair synthesizer 314 may synthesize texture for the hair of hairy head 312 and generate synthesized image 108, including the hair with synthesized texture. Although not illustrated in FIG. 3, hair synthesizer 314 may receive, as inputs, enrollment images 102, hair geometry 304, bald head 104, and/or target viewing angle 308 in addition to hairy head 312. Thus, hair synthesizer 314 may generate synthesized image 108 based on enrollment images 102, hair geometry 304, bald head 104, target viewing angle 308, and/or hairy head 312. Hair synthesizer 314 may be trained using enrollment images of a plurality of different people.

Figure 4:
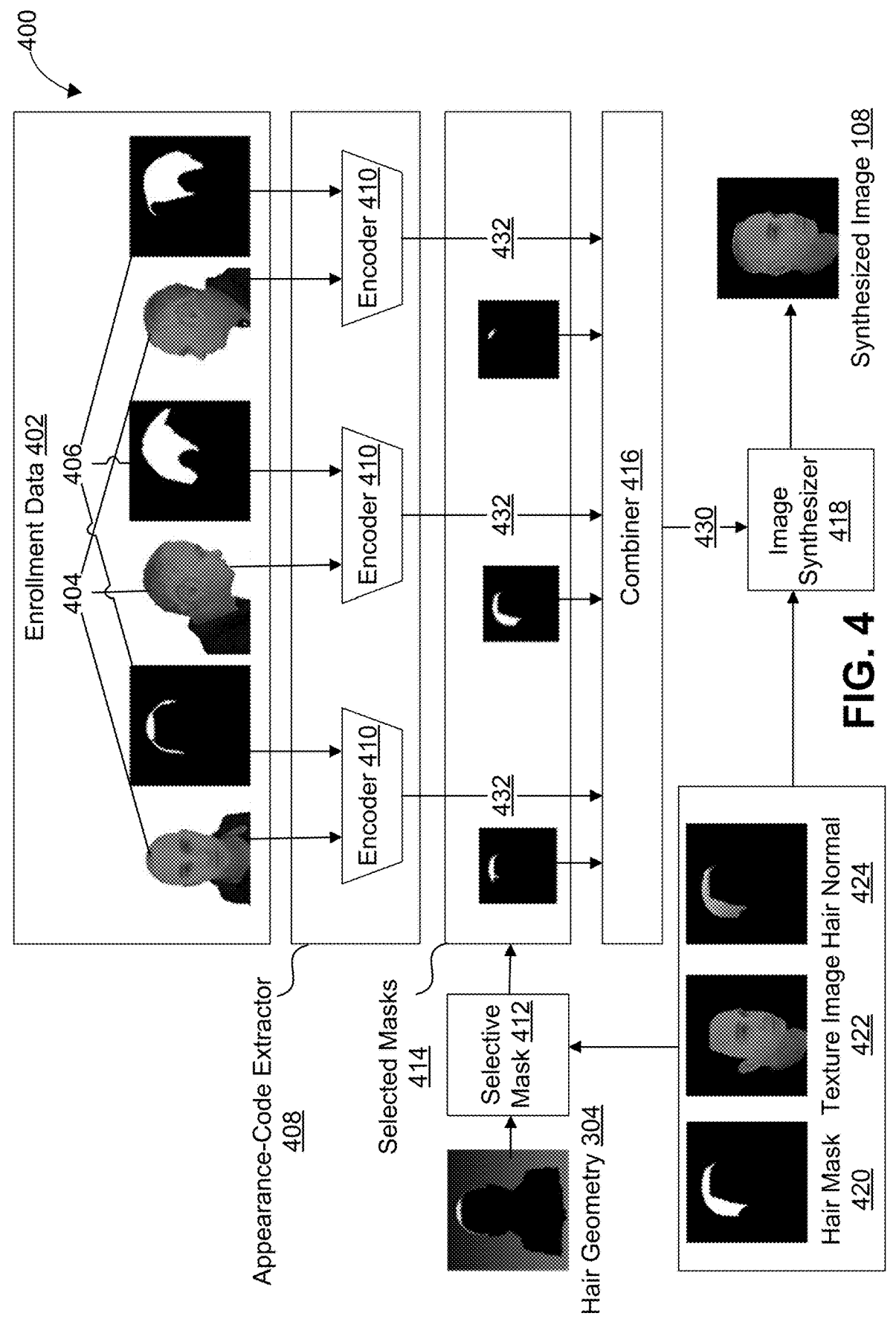
FIG. 4 is a diagram illustrating an example system that may generate synthesized image, according to various aspects of the present disclosure.

FIG. 4 is a diagram illustrating an example system 400 that may generate synthesized image 108, according to various aspects of the present disclosure. System 400 may be an example of hair synthesizer 314 of FIG. 3.

System 400 may obtain enrollment data 402. Enrollment data 402 includes enrollment images 404 (which may be an example of enrollment images 102 of FIG. 1). Enrollment data 402 may also include image masks 406. Image masks 406 may include masks indicative of which pixels of enrollment images 404 represent a characteristic (e.g., hair) of the subject (e.g., the head of the person).

Appearance-code extractor 408 may generate image features 432 based on each of enrollment images 404 and a corresponding one of image masks 406. For example, appearance-code extractor 408 may include an encoder 410 to encode an enrollment image 404 along with a corresponding image mask 406 to generate image features 432. Appearance-code extractor 408 may be, or may include, one or more particle convolutional neural networks (CNNs). For example, encoder 410 may be, or may include, a particle CNN. An example of appearance-code extractor 408 is provided below with regard to system 500 of FIG. 5.

Selective mask 412 may generate selected masks 414 based on hair geometry 304, hair mask 420, texture image 422, and hair normal 424. As described previously, hair geometry 304 may be generated by, for example, a geometry network 302 based on enrollment images (e.g., enrollment images 404). Hair mask 420, texture image 422, and hair normal 424 may be determined based on hairy head 312 and target viewing angle 308. For example, texture image 422 may be determined based on bald head 104 as it appears from target viewing angle 308, for example, as the head, absent hair, appears in hairy head 312. Further, hair mask 420 may be determined based on hair as it appears in hairy head 312. Further hair normal 424 may be determined based on hair geometry 304, for example, as the hair appears in hairy head 312.

Selective mask 412 may generate selected masks 414, which may indicate which enrollment images 404 are relevant to synthesized image 108. For example, in some aspects, system 400 may select enrollment images 404 from a larger set of enrollment images (not illustrated in FIG. 4) based on a target viewing angle (e.g., target viewing angle 308). For example, system 400 may select enrollment images 404 from among the larger set of images based on the viewing angle from which enrollment images 404 were captured being similar to target viewing angle 308. In some aspects, the selected enrollment images may be selected prior to encoding the selected enrollment images at appearance-code extractor 408. For example, the selected enrollment images may be selected then encoded at appearance-code extractor 408 and the enrollment images that are not selected may not be encoded at appearance-code extractor 408.

Additionally or alternatively, selective mask 412 may generate selected masks 414 to indicate which portions of enrollment images 404 are relevant to synthesized image 108. For example, selected masks 414 may indicate which pixels of enrollment image 404 to use to generate features based on hair as the hair is viewed from target viewing angle 308. Examples of selective masks are illustrated with regard to FIG. 6 and FIG. 7.

Combiner 416 may combine image features 432 from various enrollment images 404 based on selected mask 414 to generate combined appearance features 430. Combiner 416 may be, or may include, a machine-learning model trained to generate combined appearance features based on image features and masks.

Image synthesizer 418 may generate synthesized image 108 based on hair mask 420, texture image 422, hair normal 424, and combined appearance features 430. For example, image synthesizer 418 may synthesize texture image 422 and combined appearance features 430 to generate synthesized image 108.

Figure 5:
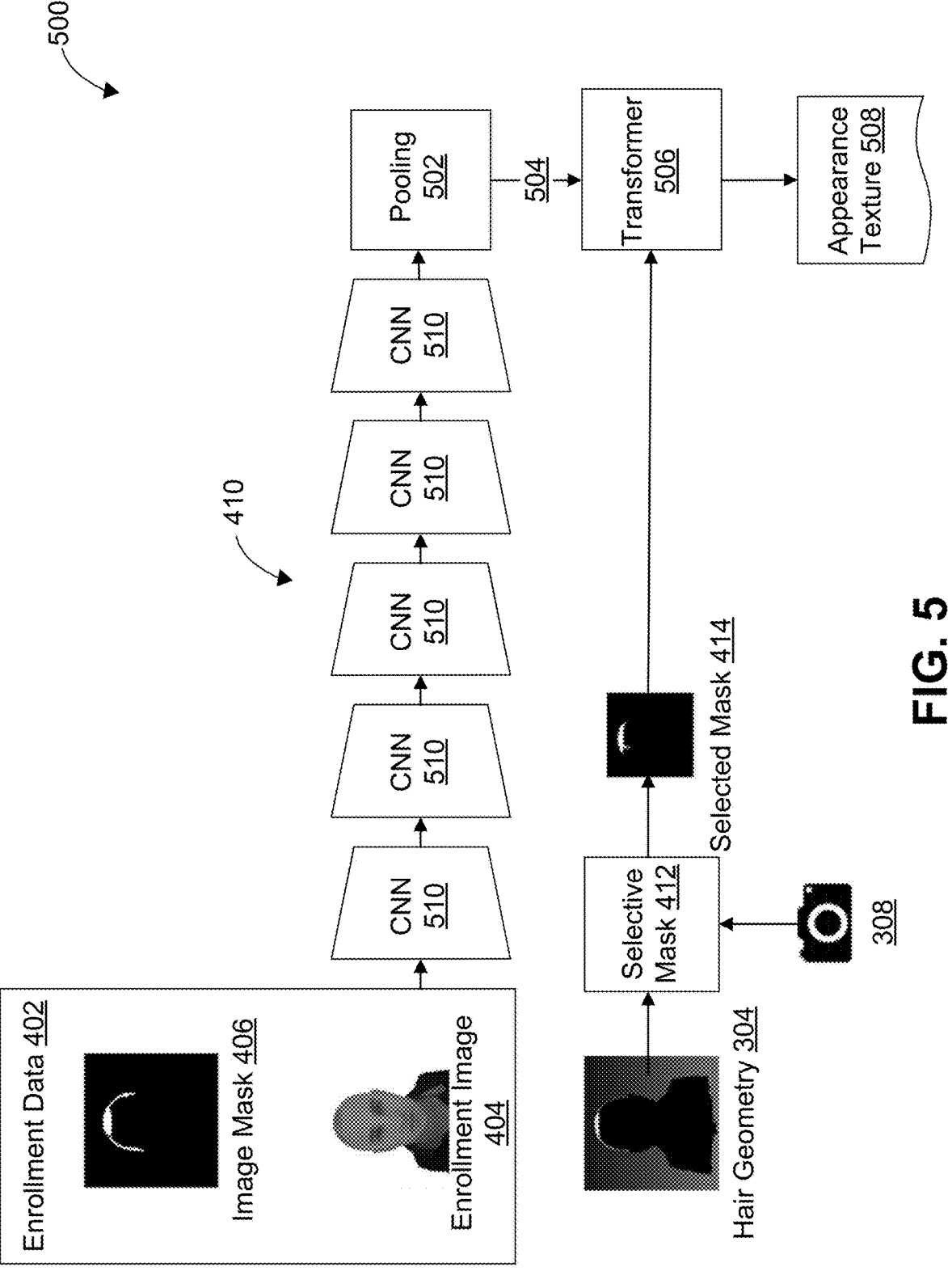
FIG. 5 is a diagram illustrating an example system for generating appearance texture based on enrollment data and a selected mask, according to various aspects of the present disclosure.

FIG. 5 is a diagram illustrating an example system 500 for generating appearance texture 508 based on enrollment data 402 and a selected mask 414, according to various aspects of the present disclosure. System 500 may include an example of example operations of appearance-code extractor 408 and combiner 416 of FIG. 4.

System 500 may obtain enrollment data 402 including multiple enrollment images 404 and multiple corresponding image masks 406. For simplicity, the operations of system 500 of FIG. 5 are described and illustrated with respect to one enrollment image 404, one corresponding image mask 406, and one corresponding selected mask 414.

System 500 may extract image features from enrollment image 404 using encoder 410. Encoder 410 may include any number of partial CNNs 510. For example, five partial CNNs 510 are illustrated in FIG. 5. Each of partial CNNs 510 may be, or may include, several layers convolution layers and/or a normalization (e.g., an instantNorm). Pooling 502 may pool image features to generate appearance code 504. Pooling 502 may be, or may include, mask-based average pooling.

System 500 may generate an instance of appearance code 504 for each enrollment image of enrollment data 402. Each of the appearance codes 504 may be stored. Selected appearance codes 504 may be used at inference. For example, selective mask 412 may generate selected mask 414 based on hair geometry 304, hair mask 420, texture image 422, and hair normal 424 at inference. For example, at inference, system 300 may generate hair geometry 304 and generate hairy head 312 based on a given target viewing angle 308. Further, selective mask 412 may generate selected mask 414 based on hair geometry 304, and hair mask 420, texture image 422, and hair normal 424 (which hair mask 420, texture image 422, and hair normal 424 may be based on hairy head 312). Transformer 506 generate appearance texture 508 based on appearance code 504 and selected mask 414 and hair normal, 424. For example, transformer 506 may select from among previously-determined appearance code 504 based on a selected mask 414 determined at inference. In this way, transformer 506 may transform appearance code 504 determined based on enrollment data 402 into appearance texture 508 that may be relevant to target viewing angle 308.

FIG. 6 includes several images to illustrate operations of selective mask 412 of FIG. 4 and FIG. 5, according to various aspects of the present disclosure. For example, FIG. 6 includes three enrollment images, including an enrollment image 602 captured from a first viewing angle (e.g., straight on), enrollment image 604 captured from a second viewing angle (e.g., from the left side), and enrollment image 606 captured from a third viewing angle (e.g., from the right side).

Vertex image 610 is an image illustrating example activate vertices for enrollment image 602. Vertex image 612 is an image illustrating example activate vertices for enrollment image 604. Vertex image 614 is an image illustrating example activate vertices for enrollment image 606. The white pixels in each of vertex image 610, vertex image 612, and vertex image 614 illustrate the activate vertices associated with each respective view of the respective enrollment images.

FIG. 7 includes several images and corresponding masks to illustrate operations of selective mask 412 of FIG. 4 and FIG. 5, according to various aspects of the present disclosure. FIG. 6 illustrates activate vertices and FIG. 7 illustrates example selective masks, based on an example target view. For example, FIG. 7 includes three enrollment images, including an enrollment image 702 captured from a first viewing angle (e.g., straight on), enrollment image 704 captured from a second viewing angle (e.g., from the left side), and enrollment image 706 captured from a third viewing angle (e.g., from the right side).

FIG. 7 includes an example bald head 708, for example, a bald head from an example target view (e.g., from the right). Bald head 708 may be an example of bald head 104 of FIG. 1. In many instances, the target view may not match a view from which one of the enrollment images was captured.

FIG. 7 includes an image 710 that may be an example of selective vertices rasterized in the target view. Image 710 may include vertices that may be relevant to a view of the characteristic of the subject as viewed from the target viewing angle. Image 710 includes white pixels. The white pixels of image 710 indicate pixels of a synthesized image (e.g., synthesized image 108) that may be based on enrollment image 702. Image 710 may be used to construct an appearance feature for the characteristic of the person of enrollment image 702 as the characteristic is viewed from the target viewing angle. Based on the difference between the target viewing angle and the viewing angle from which enrollment image 702 is captured, pixels on the right half of the hair of the synthesized image may be based on features derived from enrollment image 702.

The absence of white pixels in mask 712 may indicate that no pixels of the synthesized image that may be based on enrollment image 704. Mask 712 may be used to select image features (e.g., based on enrollment image 704) that may be used to construct an appearance feature for the hair of the person of enrollment image 704 as the hair is viewed from the target viewing angle. Based on the difference between the target viewing angle and the viewing angle from which enrollment image 704 is captured, no pixels of the synthesized image may be based on features derived from enrollment image 704. As such, enrollment image 704 may be an example of an enrollment images that is not selected for use in generating the synthesized image.

White pixels of mask 714 indicate pixels of the synthesized image that may be based on enrollment image 706. Mask 714 may be used to select image features (e.g., based on enrollment image 706) that may be used to construct an appearance feature for the hair of the person of enrollment image 706 as the hair is viewed from the target viewing angle. Based on the similarity between the target viewing angle and the viewing angle from which the synthesized image is to be generated, mask 714 appears similar to a mask indicating hair of enrollment image 706.

Figure 8:
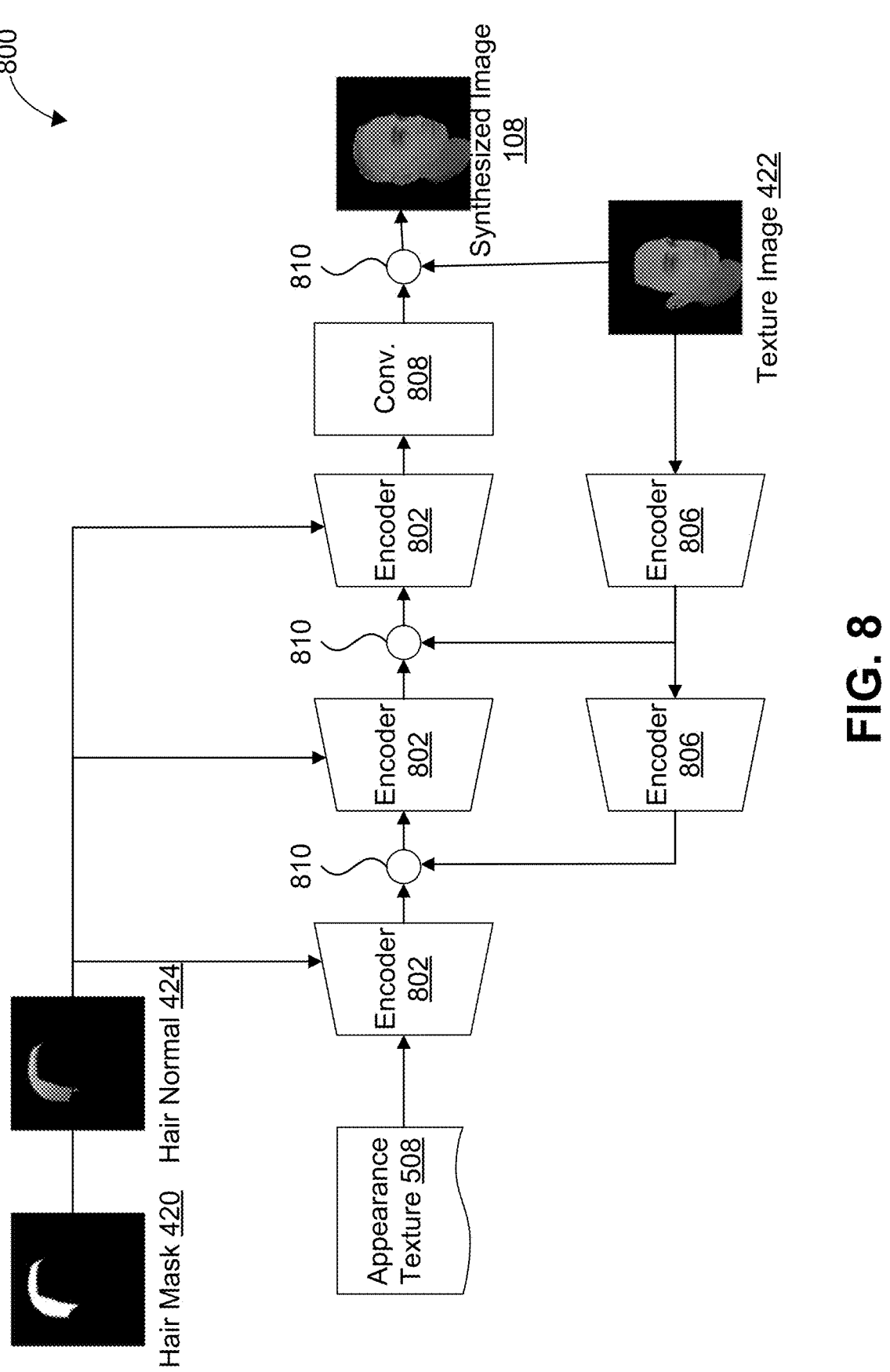
FIG. 8 is a diagram illustrating an example system for generating a synthesized image, according to various aspects of the present disclosure.

FIG. 8 is a diagram illustrating an example system 800 for generating a synthesized image 108, according to various aspects of the present disclosure. System 800 may illustrate an example of operations of image synthesizer 418 of FIG. 4. In some aspects, system 800 may be, or may include, a residual network (a ResNet). In some aspects, system 800 may be, or may include, a spatially adaptive (SPADE) network. System 800 may generate synthesized image 108 based on hair mask 420, texture image 422, hair normal 424, and appearance texture 508.

System 800 may include any number of encoder 802, any number of encoder 806, and/or any number of combiners 810. Each of encoder 802 and encoder 806 may be, or may include, one or more convolutional layers. In FIG. 8, system 800 is illustrated including three encoder 802, two encoder 806, and three combiners 810. In other examples, system 800 may include five encoder 802, four encoder 806, and five combiners 810.

System 800 may generate synthesized image 108 by combining features based on appearance texture 508, hair mask 420 and hair normal 424 with features based on texture image 422. After combining features at multiple encoder 802 and/or combiners 810 (e.g., concatenators) between encoder 802, convolver 808 may convolve the features. Further, the convolved features may be combined with texture image 422 at a combiner 810.

Figure 9:
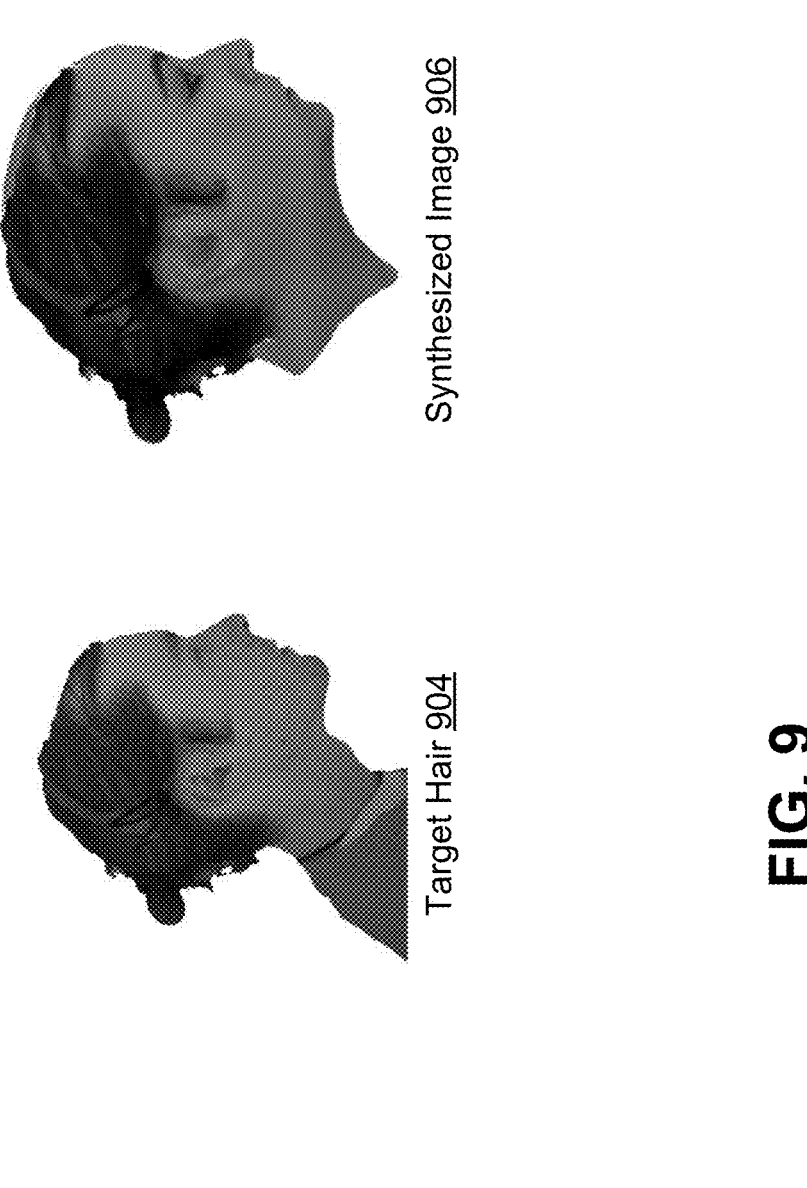
FIG. 9 illustrates results of an alternative use of the systems and techniques of the present disclosure.

FIG. 9 illustrates results of an alternative use of the systems and techniques of the present disclosure. For example, in addition to or as alternative to generating views of a head from a target viewing angle, the systems and techniques may swap hair. For example, the systems and techniques may take target hair 904 from an example target image and place it on a source head 902 of an example source image to generate a synthesized image 906.

For example, returning to FIG. 3 and FIG. 4, system 300 may generate hair geometry 304 based on target hair 904 and bald head 104 based on a source head 902. For example, system 300 may obtain enrollment images of a person of source head 902 and separate enrollment images of a person of target hair 904. System 300 may use the enrollment images of the person of source head 902 to generate bald head 104. Separately, system 300 may use the enrollment images of the person of target hair 904 to generate hair geometry 304. System 300 may then combine the features and synthesize synthesized image 906 based on bald head 104 and hair geometry 304.

FIG. 10 is a flow diagram illustrating a process 1000 for generating image data, in accordance with aspects of the present disclosure. One or more operations of process 1000 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 1000. The one or more operations of process 1000 may be implemented as software components that are executed and run on one or more processors.

At block 1002, a computing device (or one or more components thereof) may select enrollment images from among a plurality of enrollment images of a subject based on a target viewing angle, wherein each enrollment image of the plurality of enrollment images represents the subject as viewed from a different respective viewing angle. For example, system 400 of FIG. 4 (e.g., based on selective mask 412) may select an enrollment images 404 of FIG. 4 from among a larger set of enrollment images based on target viewing angle 308 of FIG. 3. Each of enrollment images 404 may represent the same subject as captured from a different viewing angle.

In some aspects, the selected enrollment images are selected based on a relationship between respective viewing angles of the selected enrollment images and the target viewing angle. For example, the selected enrollment image of enrollment images 404 of may be selected (e.g., at block 1002) based on a relationship (e.g., similarity) between target viewing angle 308 of FIG. 3 and the viewing angle from which the selected enrollment image was captured.

At block 1004, the computing device (or one or more components thereof) may determine, from the selected enrollment images, appearance features representing at least one characteristic of the subject in the selected enrollment images. For example, appearance-code extractor 408 of FIG. 4 may generate image features 432 representing characteristics of the subject.

In some aspects, the subject may be a head of a person and the at least one characteristic may be hair of the person.

In some aspects, the appearance features are generated by an appearance-code extractor. For example, appearance-code extractor 408 of FIG. 4 may generate image features 432.

In some aspects, to generate the appearance features, the computing device (or one or more components thereof) may process the plurality of enrollment images using machine-learning model to generate image features; pool the image features based on a mask indicative of the at least one characteristic to generate characteristic features; and transform the characteristic features based on the selected enrollment images to generate the appearance features. For example, appearance-code extractor 408 of FIG. 4 and/or encoders 410 of FIG. 4 and FIG. 5 may process enrollment images 404 to generate image features. Further appearance-code extractor 408, for example, at pooling 502 may pool the image features (e.g., image features 432) based on a mask indicative of a characteristic. Further, appearance-code extractor 408, for example, at transformer 506, may transform characteristic features based on the selected enrollment images to generate image features 432.

At block 1006, the computing device (or one or more components thereof) may combine the appearance features based on a three-dimensional geometry of the subject to generate combined appearance features. For example, combiner 416 of combine image features 432 to generate combined appearance features 430 based on a three-dimensional geometry of the subject.

In some aspects, to combine the appearance features, the computing device (or one or more components thereof) may process the appearance features using a machine-learning model to generate the combined appearance features. For example, system 400 may use combiner 416, which may be, or may include, a machine-learning model, to generate combined appearance features 430.

At block 1008, the computing device (or one or more components thereof) may generate an image of the subject from the target viewing angle based on a texture image of the subject and the combined appearance features. For example, image synthesizer 418 of FIG. 4 may generate synthesized image 108 based on combined appearance features 430 and texture image 422.

In some aspects, to generate the image, the at least one processor is configured to process the appearance features and a mask indicative of the at least one characteristic using a machine-learning model to generate the combined appearance features. For example, image synthesizer 418 may process combined appearance features 430 and hair mask 420 to generate synthesized image 108.

In some aspects, the texture image of the subject may be, or may include, an image of the subject without the at least one characteristic from the target viewing angle; and the image of the subject includes the at least one characteristic. For example, texture image 422 may be, or may include, an image of the subject without hair and synthesized image 108 may include hair.

In some aspects, the image of the subject is generated further based on normals of planes of the at least one characteristic. For example, image synthesizer 418 may generate synthesized image 108 based on hair normal 424, which may be, or may include, normals of hair of the subject.

In some examples, as noted previously, the methods described herein (e.g., process 1000 of FIG. 10, and/or other methods described herein) can be performed, in whole or in part, by a computing device or apparatus. In one example, one or more of the methods can be performed by system 100 of FIG. 1, system 300 of FIG. 3, system 400 of FIG. 4, system 500 of FIG. 5, system 800 of FIG. 8, or by another system or device. In another example, one or more of the methods (e.g., process 1000 of FIG. 10, and/or other methods described herein) can be performed, in whole or in part, by the computing-device architecture 1300 shown in FIG. 13. For instance, a computing device with the computing-device architecture 1300 shown in FIG. 13 can include, or be included in, the components of the system 100, system 300, system 400, system 500, system 800, and can implement the operations of process 1000, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1000, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1000, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 11:
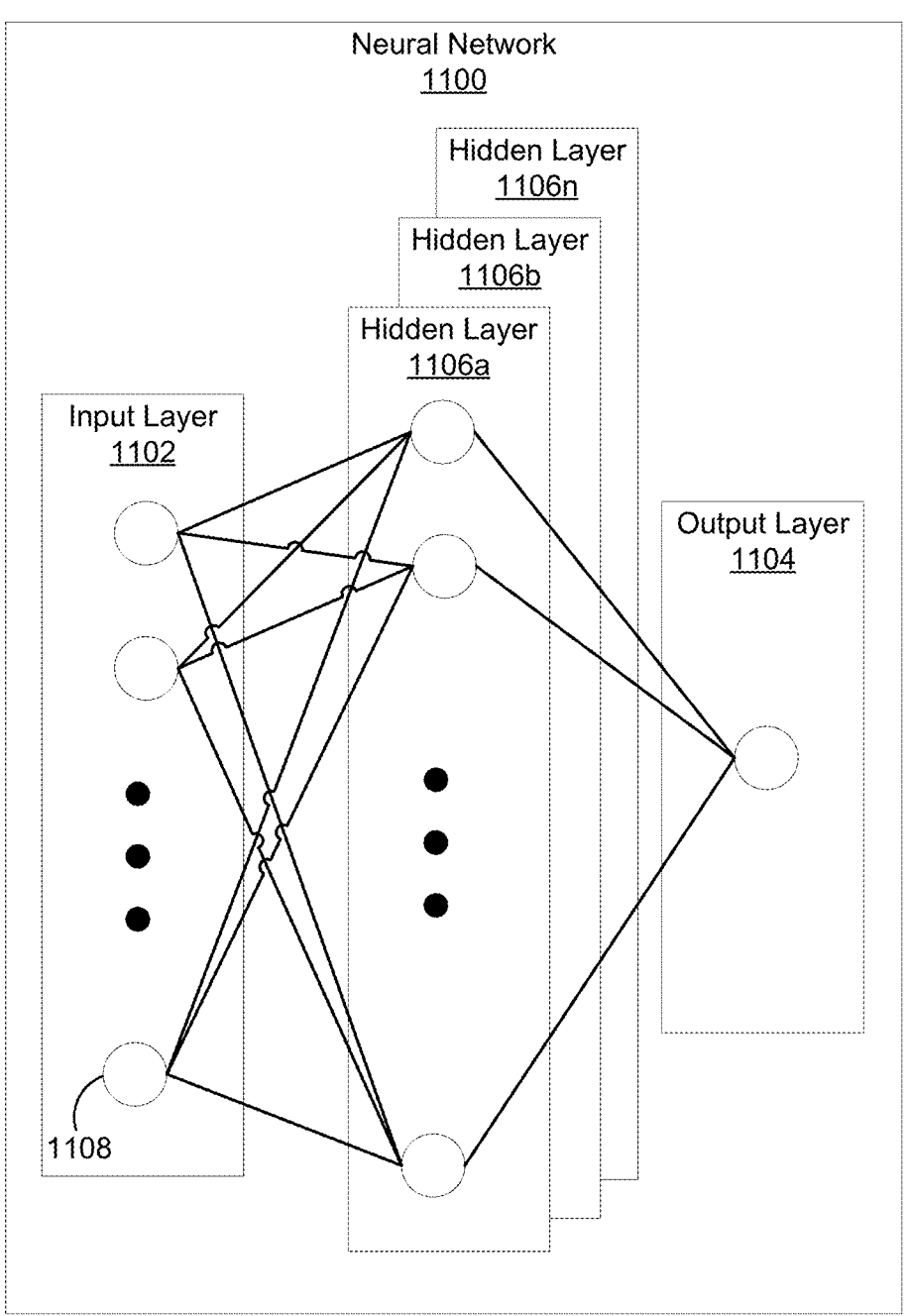
FIG. 11 is a block diagram illustrating an example of a deep learning neural network that can be used to perform various tasks, according to some aspects of the disclosed technology.

FIG. 11 is an illustrative example of a neural network 1100 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 1100 may be an example of, or can implement, image synthesizer 106 of FIG. 1, geometry network 302 of FIG. 3, combiner 306, of FIG. 3, bald-head generator 310 of FIG. 3, hair synthesizer 314 of FIG. 3, appearance-code extractor 408 of FIG. 4, encoder 410 of FIG. 4 and/or FIG. 5, selective mask 412 of FIG. 4 and/or FIG. 5, combiner 416 of FIG. 4, image synthesizer 418 of FIG. 4, system 500 of FIG. 5, pooling 502 of FIG. 5, transformer 506 of FIG. 5, partial CNNs 510 of FIG. 5, system 800 of FIG. 8, encoder 802 of FIG. 8, and/or encoder 806 of FIG. 8.

An input layer 1102 includes input data. In one illustrative example, input layer 1102 can include data representing enrollment images 102 of FIG. 1 and/or FIG. 3, bald head 104 of FIG. 1 and/or FIG. 3, hair geometry 304 of FIG. 3, FIG. 4, and/or FIG. 5, target viewing angle 308 of FIG. 3 and/or FIG. 5, hairy head 312 of FIG. 3, enrollment data 402 of FIG. 4 and/or FIG. 5, enrollment images 404 of FIG. 4 and/or FIG. 5, image masks 406 of FIG. 4 and/or FIG. 5, selected mask 414 of FIG. 4 and/or FIG. 5, hair mask 420 of FIG. 4 and/or FIG. 8, texture image 422 of FIG. 4 and/or FIG. 8, hair normal 424 of FIG. 4 and/or FIG. 8, and/or appearance texture 508 of FIG. 8. Neural network 1100 includes multiple hidden layers hidden layers 1106a, 1106b, through 1106n. The hidden layers 1106a, 1106b, through 1106n include "n" number of hidden layers, where "n" is an integer greater than or equal to one. The number of hidden layers can be made to include as many layers as needed for the given application. Neural network

1100 further includes an output layer 1104 that provides an output resulting from the processing performed by the hidden layers 1106*a*, 1106*b*, through 1106*n*. In one illustrative example, output layer 1104 can provide synthesized image 108 of FIG. 1, FIG. 3, and/or FIG. 8, synthesized image 208 of FIG. 2, hair geometry 304 of FIG. 3, bald head 104 of FIG. 3, hairy head 312 of FIG. 3, image features 432 of FIG. 4, selected masks 414 of FIG. 4, combined appearance features 430 of FIG. 4, hair mask 420 of FIG. 4 and/or FIG. 8, texture image 422 of FIG. 4 and/or FIG. 8, hair normal 424 of FIG. 4 and/or FIG. 8, appearance code 504 of FIG. 5, and/or appearance texture 508 of FIG. 5.

Neural network 1100 may be, or may include, a multi-layer neural network of interconnected nodes. Each node can represent a piece of information. Information associated with the nodes is shared among the different layers and each layer retains information as information is processed. In some cases, neural network 1100 can include a feed-forward network, in which case there are no feedback connections where outputs of the network are fed back into itself. In some cases, neural network 1100 can include a recurrent neural network, which can have loops that allow information to be carried across nodes while reading in input.

Information can be exchanged between nodes through node-to-node interconnections between the various layers. Nodes of input layer 1102 can activate a set of nodes in the first hidden layer 1106*a*. For example, as shown, each of the input nodes of input layer 1102 is connected to each of the nodes of the first hidden layer 1106*a*. The nodes of first hidden layer 1106*a* can transform the information of each input node by applying activation functions to the input node information. The information derived from the transformation can then be passed to and can activate the nodes of the next hidden layer 1106*b*, which can perform their own designated functions. Example functions include convolutional, up-sampling, data transformation, and/or any other suitable functions. The output of the hidden layer 1106*b* can then activate nodes of the next hidden layer, and so on. The output of the last hidden layer 1106*n* can activate one or more nodes of the output layer 1104, at which an output is provided. In some cases, while nodes (e.g., node 1108) in neural network 1100 are shown as having multiple output lines, a node has a single output and all lines shown as being output from a node represent the same output value.

In some cases, each node or interconnection between nodes can have a weight that is a set of parameters derived from the training of neural network 1100. Once neural network 1100 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1100 to be adaptive to inputs and able to learn as more and more data is processed.

Neural network 1100 may be pre-trained to process the features from the data in the input layer 1102 using the different hidden layers 1106*a*, 1106*b*, through 1106*n* in order to provide the output through the output layer 1104. In an example in which neural network 1100 is used to identify features in images, neural network 1100 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1100 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 1100 is trained well enough so that the weights of the layers are accurately tuned.

For the example of identifying objects in images, the forward pass can include passing a training image through neural network 1100. The weights are initially randomized before neural network 1100 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1100, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1100 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1100 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_1 - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 1100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1100 can include any other deep network other than a CNN, such as an autoencoder, a deep belief nets (DBNs), a Recurrent Neural Networks (RNNs), among others.

Figure 12:
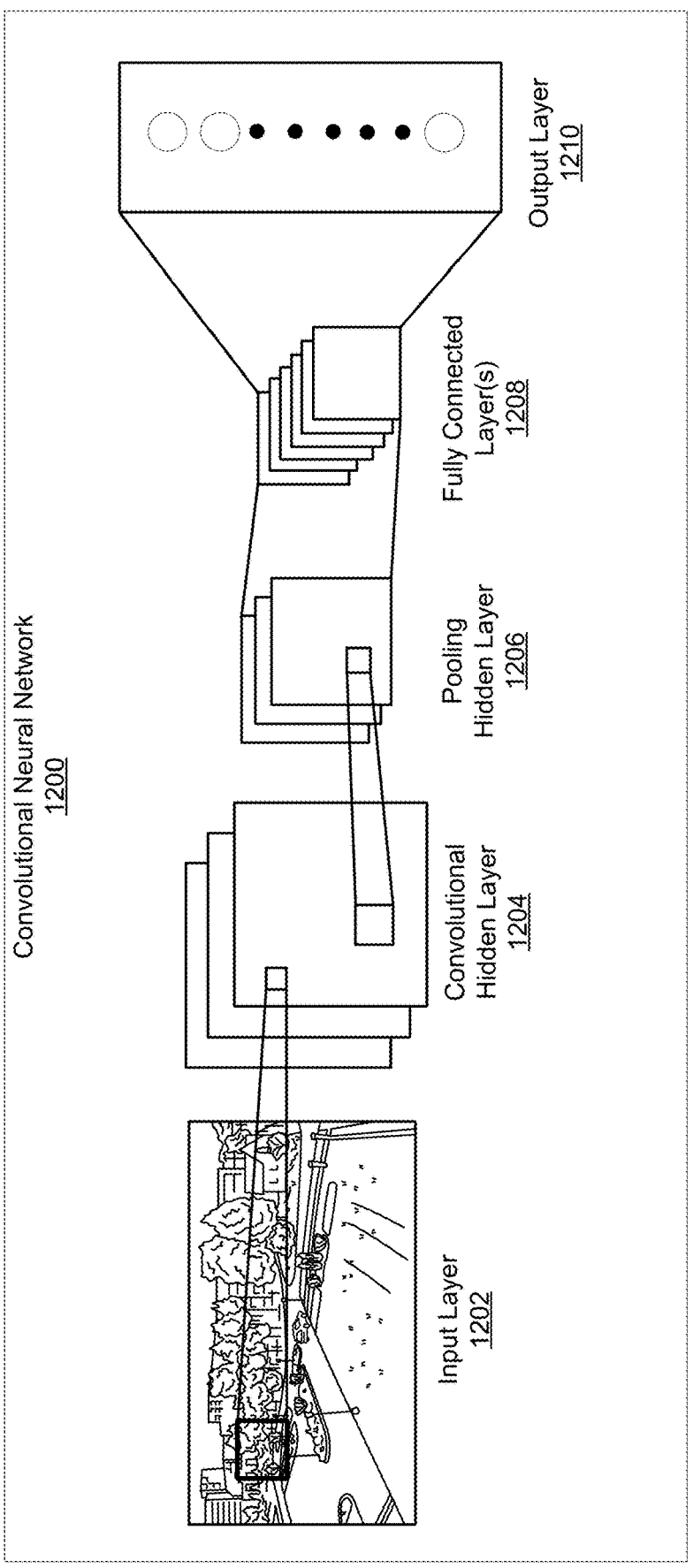
FIG. 12 is a block diagram illustrating an example of a convolutional neural network (CNN), according to various aspects of the present disclosure.

FIG. 12 is an illustrative example of a convolutional neural network (CNN) 1200. The input layer 1202 of the CNN 1200 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1204, an optional non-linear activation layer, a pooling hidden layer 1206, and fully connected layer 1208 (which fully connected layer 1208 can be hidden) to get an output at the output layer 1210. While only one of each hidden layer is shown in FIG. 12, one of ordinary skill will appreciate that multiple convolutional hidden layers, non-linear layers, pooling hidden layers, and/or fully connected layers can be included in the CNN 1200. As previously described, the output can indicate a single class of an object or can include a probability of classes that best describe the object in the image.

The first layer of the CNN 1200 can be the convolutional hidden layer 1204. The convolutional hidden layer 1204 can analyze image data of the input layer 1202. Each node of the convolutional hidden layer 1204 is connected to a region of nodes (pixels) of the input image called a receptive field. The convolutional hidden layer 1204 can be considered as one or more filters (each filter corresponding to a different activation or feature map), with each convolutional iteration of a filter being a node or neuron of the convolutional hidden layer 1204. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1204. Each connection between a node and a receptive field for that node learns a weight and, in some cases, an overall bias such that each node learns to analyze its particular local receptive field in the input image. Each node of the convolutional hidden layer 1204 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1204 is due to each node of the convolutional layer being applied to its corresponding receptive field. For example, a filter of the convolutional hidden layer 1204 can begin in the top-left corner of the input image array and can convolve around the input image. As noted above, each convolutional iteration of the filter can be considered a node or neuron of the convolutional hidden layer 1204. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1204. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1204.

The mapping from the input layer to the convolutional hidden layer 1204 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1204 can include several activation maps in order to identify multiple features in an image. The example shown in FIG. 12 includes three activation maps. Using three activation maps, the convolutional hidden layer 1204 can detect three different kinds of features, with each feature being detectable across the entire image.

In some examples, a non-linear hidden layer can be applied after the convolutional hidden layer 1204. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1200 without affecting the receptive fields of the convolutional hidden layer 1204.

The pooling hidden layer 1206 can be applied after the convolutional hidden layer 1204 (and after the non-linear hidden layer when used). The pooling hidden layer 1206 is used to simplify the information in the output from the convolutional hidden layer 1204. For example, the pooling hidden layer 1206 can take each activation map output from the convolutional hidden layer 1204 and generates a condensed activation map (or feature map) using a pooling function. Max-pooling is one example of a function performed by a pooling hidden layer. Other forms of pooling functions be used by the pooling hidden layer 1206, such as average pooling, L2-norm pooling, or other suitable pooling functions. A pooling function (e.g., a max-pooling filter, an L2-norm filter, or other suitable pooling filter) is applied to each activation map included in the convolutional hidden layer 1204. In the example shown in FIG. 12, three pooling filters are used for the three activation maps in the convolutional hidden layer 1204.

In some examples, max-pooling can be used by applying a max-pooling filter (e.g., having a size of 2×2) with a stride (e.g., equal to a dimension of the filter, such as a stride of 2) to an activation map output from the convolutional hidden layer 1204. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1204 having a dimension of 24×24 nodes, the output from the pooling hidden layer 1206 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1200.

The final layer of connections in the network is a fully-connected layer that connects every node from the pooling hidden layer 1206 to every one of the output nodes in the output layer 1210. Using the example above, the input layer includes 28×28 nodes encoding the pixel intensities of the input image, the convolutional hidden layer 1204 includes 3×24×24 hidden feature nodes based on application of a 5×5 local receptive field (for the filters) to three activation maps, and the pooling hidden layer 1206 includes a layer of 3×12×12 hidden feature nodes based on application of max-pooling filter to 2×2 regions across each of the three feature maps. Extending this example, the output layer 1210 can include ten output nodes. In such an example, every node of the 3×12×12 pooling hidden layer 1206 is connected to every node of the output layer 1210.

The fully connected layer 1208 can obtain the output of the previous pooling hidden layer 1206 (which should represent the activation maps of high-level features) and determines the features that most correlate to a particular class. For example, the fully connected layer 1208 can determine the high-level features that most strongly correlate to a particular class and can include weights (nodes) for the high-level features. A product can be computed between the weights of the fully connected layer 1208 and the pooling hidden layer 1206 to obtain probabilities for the different classes. For example, if the CNN 1200 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1210 can include an M-dimensional vector (in the prior example, M=10). M indicates the number of classes that the CNN 1200 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 13:
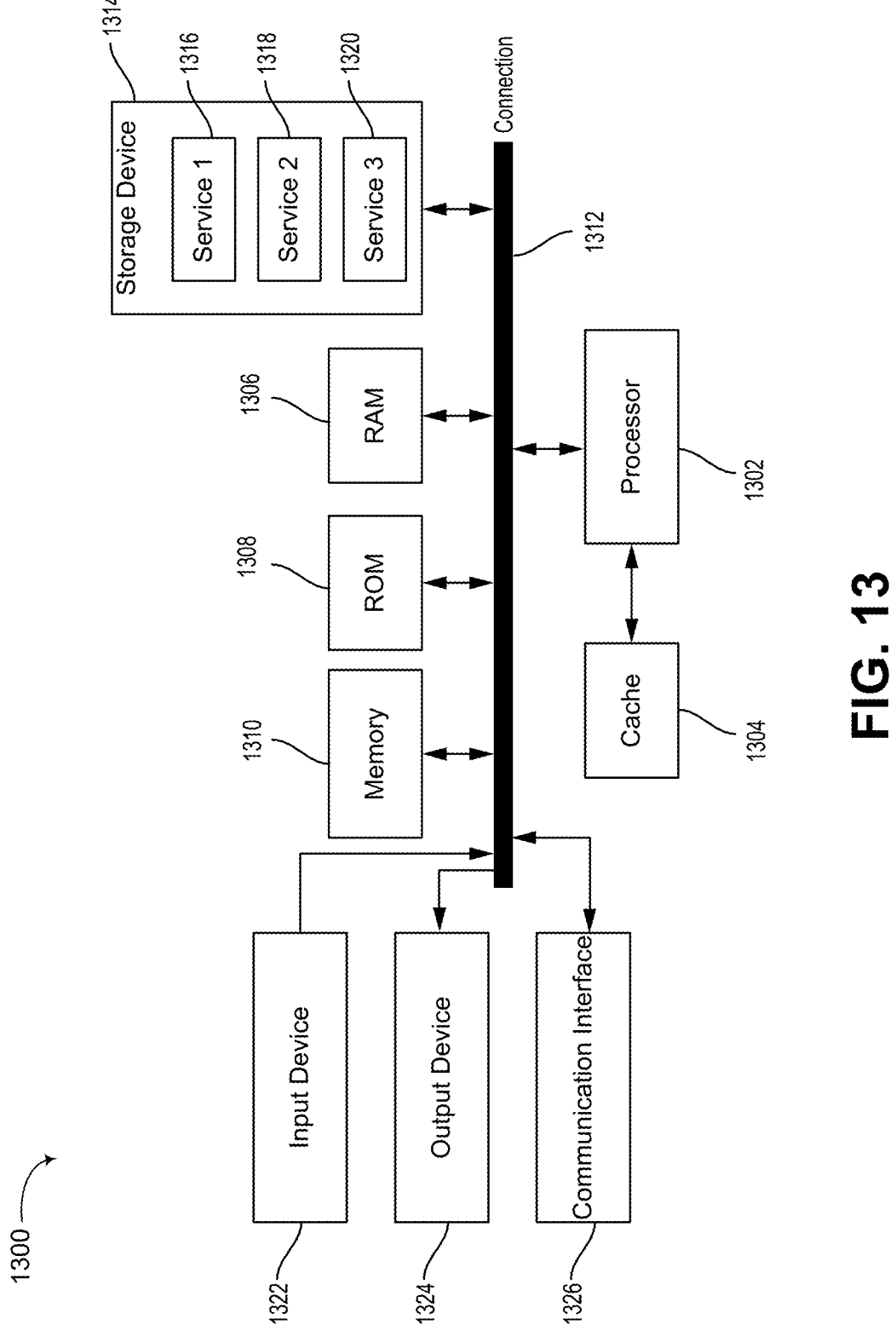
FIG. 13 is a block diagram illustrating an example computing-device architecture of an example computing device which can implement the various techniques described herein.

FIG. 13 illustrates an example computing-device architecture 1300 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1300 may include, implement, or be included in any or all of system 100 of FIG. 1, system 300 of FIG. 3, system 400 of FIG. 4, system 500 of FIG. 5, system 800 of FIG. 8. Additionally or alternatively, computing-device architecture 1300 may be configured to perform process 1000, and/or other process described herein.

The components of computing-device architecture 1300 are shown in electrical communication with each other using connection 1312, such as a bus. The example computing-device architecture 1300 includes a processing unit (CPU or processor) 1302 and computing device connection 1312 that couples various computing device components including computing device memory 1310, such as read only memory (ROM) 1308 and random-access memory (RAM) 1306, to processor 1302.

Computing-device architecture 1300 can include a cache of high-speed memory connected directly with, in close proximity to, or integrated as part of processor 1302. Computing-device architecture 1300 can copy data from memory 1310 and/or the storage device 1314 to cache 1304 for quick access by processor 1302. In this way, the cache can provide a performance boost that avoids processor 1302 delays while waiting for data. These and other modules can control or be configured to control processor 1302 to perform various actions. Other computing device memory 1310 may be available for use as well. Memory 1310 can include multiple different types of memory with different performance characteristics. Processor 1302 can include any general-purpose processor and a hardware or software service, such as service 1 1316, service 2 1318, and service 3 1320 stored in storage device 1314, configured to control processor 1302 as well as a special-purpose processor where software instructions are incorporated into the processor design. Processor 1302 may be a self-contained system, containing multiple cores or processors, a bus, memory controller, cache, etc. A multi-core processor may be symmetric or asymmetric.

To enable user interaction with the computing-device architecture 1300, input device 1322 can represent any number of input mechanisms, such as a microphone for speech, a touch-sensitive screen for gesture or graphical input, keyboard, mouse, motion input, speech and so forth. Output device 1324 can also be one or more of a number of output mechanisms known to those of skill in the art, such as a display, projector, television, speaker device, etc. In some instances, multimodal computing devices can enable a user to provide multiple types of input to communicate with computing-device architecture 1300. Communication interface 1326 can generally govern and manage the user input and computing device output. There is no restriction on operating on any particular hardware arrangement and therefore the basic features here may easily be substituted for improved hardware or firmware arrangements as they are developed.

Storage device 1314 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1306, read only memory (ROM) 1308, and hybrids thereof. Storage device 1314 can include services 1316, 1318, and 1320 for controlling processor 1302. Other hardware or software modules are contemplated. Storage device 1314 can be connected to the computing device connection 1312. In one aspect, a hardware module that performs a particular function can include the software component stored in a computer-readable medium in connection with the necessary hardware components, such as processor 1302, connection 1312, output device 1324, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for generating image data, the apparatus comprising: at least one memory; and at least one processor coupled to the at least one memory and configured to: select enrollment images from among a plurality of enrollment images of a subject based on a target viewing angle, wherein each enrollment image of the plurality of enrollment images represents the subject as viewed from a different respective viewing angle; determine, from the selected enrollment images, appearance features representing at least one characteristic of the subject in the selected enrollment images; combine the appearance features based on a three-dimensional geometry of the subject to generate combined appearance features; and generate an image of the subject from the target viewing angle based on a texture image of the subject and the combined appearance features.

Aspect 2. The apparatus of aspect 1, wherein the selected enrollment images are selected based on a relationship between respective viewing angles of the selected enrollment images and the target viewing angle.

Aspect 3. The apparatus of any one of aspects 1 or 2, wherein the appearance features are generated by an appearance-code extractor.

Aspect 4. The apparatus of any one of aspects 1 to 3, wherein, to generate the appearance features, the at least one processor is configured to: process the plurality of enrollment images using machine-learning model to generate image features; pool the image features based on a mask indicative of the at least one characteristic to generate characteristic features; and transform the characteristic features based on the selected enrollment images to generate the appearance features.

Aspect 5. The apparatus of any one of aspects 1 to 4, wherein, to combine the appearance features, the at least one processor is configured to process the appearance features using a machine-learning model to generate the combined appearance features.

Aspect 6. The apparatus of any one of aspects 1 to 5, wherein, to generate the image, the at least one processor is configured to process the appearance features and a mask indicative of the at least one characteristic using a machine-learning model to generate the combined appearance features.

Aspect 7. The apparatus of any one of aspects 1 to 6, wherein: the subject is a head of a person; and the at least one characteristic is hair of the person.

Aspect 8. The apparatus of any one of aspects 1 to 7, wherein: the texture image of the subject comprises an image of the subject without the at least one characteristic from the target viewing angle; and the image of the subject includes the at least one characteristic.

Aspect 9. The apparatus of any one of aspects 1 to 8, wherein the image of the subject is generated further based on normals of planes of the at least one characteristic.

Aspect 10. A method for generating image data, the method comprising: selecting enrollment images from among a plurality of enrollment images of a subject based on a target viewing angle, wherein each enrollment image of the plurality of enrollment images represents the subject as viewed from a different respective viewing angle; determining, from the selected enrollment images, appearance features representing at least one characteristic of the subject in the selected enrollment images; combining the appearance features based on a three-dimensional geometry of the subject to generate combined appearance features; and generating an image of the subject from the target viewing angle based on a texture image of the subject and the combined appearance features.

Aspect 11. The method of aspect 10, wherein the selected enrollment images are selected based on a relationship between respective viewing angles of the selected enrollment images and the target viewing angle.

Aspect 12. The method of any one of aspects 10 or 11, wherein the appearance features are generated by an appearance-code extractor.

Aspect 13. The method of any one of aspects 10 to 12, wherein generating the appearance features comprises: processing the plurality of enrollment images using machine-learning model to generate image features; pooling the image features based on a mask indicative of the at least one characteristic to generate characteristic features; and transforming the characteristic features based on the selected enrollment images to generate the appearance features.

Aspect 14. The method of any one of aspects 10 to 13, wherein combining the appearance features comprises processing the appearance features using a machine-learning model to generate the combined appearance features.

Aspect 15. The method of any one of aspects 10 to 14, wherein generating the image comprises processing the appearance features and a mask indicative of the at least one characteristic using a machine-learning model to generate the combined appearance features.

Aspect 16. The method of any one of aspects 10 to 15, wherein: the subject is a head of a person; and the at least one characteristic is hair of the person.

Aspect 17. The method of any one of aspects 10 to 16, wherein: the texture image of the subject comprises an image of the subject without the at least one characteristic from the target viewing angle; and the image of the subject includes the at least one characteristic.

Aspect 18. The method of any one of aspects 10 to 17, wherein the image of the subject is generated further based on normals of planes of the at least one characteristic.

Aspect 19. A non-transitory computer-readable storage medium having stored thereon instructions that, when executed by at least one processor, cause the at least one processor to: select enrollment images from among a plurality of enrollment images of a subject based on a target viewing angle, wherein each enrollment image of the plurality of enrollment images represents the subject as viewed from a different respective viewing angle; determine, from the selected enrollment images, appearance features representing at least one characteristic of the subject in the selected enrollment images; combine the appearance features based on a three-dimensional geometry of the subject to generate combined appearance features; and generate an image of the subject from the target viewing angle based on a texture image of the subject and the combined appearance features.

Aspect 20. The non-transitory computer-readable storage medium of aspect 19, wherein the selected enrollment images are selected based on a relationship between respective viewing angles of the selected enrollment images and the target viewing angle.

Aspect 21. A non-transitory computer-readable storage medium having stored thereon instructions that, when executed by at least one processor, cause the at least one processor to perform operations according to any of aspects 10 to 18.

Aspect 22. An apparatus for providing virtual content for display, the apparatus comprising one or more means for perform operations according to any of aspects 10 to 18.

What is claimed is:

1. An apparatus for generating image data, the apparatus comprising:

at least one memory; and at least one processor coupled to the at least one memory and configured to:

select enrollment images from among a plurality of enrollment images of a subject based on a target viewing angle, wherein each enrollment image of the plurality of enrollment images represents the subject as viewed from a different respective viewing angle;

process the plurality of enrollment images using machine-learning model to generate image features;

pool the image features based on a mask indicative of at least one characteristic to generate characteristic features;

transform the characteristic features based on the selected enrollment images to generate appearance features representing the at least one characteristic of the subject in the selected enrollment images;

combine the appearance features based on a three-dimensional geometry of the subject to generate combined appearance features; and generate an image of the subject from the target viewing angle based on a texture image of the subject and the combined appearance features.

2. The apparatus of claim 1, wherein the selected enrollment images are selected based on a relationship between respective viewing angles of the selected enrollment images and the target viewing angle.

3. The apparatus of claim 1, wherein the appearance features are generated by an appearance-code extractor.

4. The apparatus of claim 1, wherein, to combine the appearance features, the at least one processor is configured to process the appearance features using a machine-learning model to generate the combined appearance features.

5. The apparatus of claim 1, wherein, to combine the appearance features, the at least one processor is configured to process the appearance features and a mask indicative of the at least one characteristic using a machine-learning model to generate the combined appearance features.

6. The apparatus of claim 1, wherein:

the subject is a head of a person; and the at least one characteristic is hair of the person.

7. The apparatus of claim 1, wherein:

the texture image of the subject comprises an image of the subject without the at least one characteristic from the target viewing angle; and the generated image of the subject includes the at least one characteristic.

8. The apparatus of claim 1, wherein the image of the subject is generated further based on normals of planes of the at least one characteristic.

9. A method for generating image data, the method comprising:

selecting enrollment images from among a plurality of enrollment images of a subject based on a target viewing angle, wherein each enrollment image of the plurality of enrollment images represents the subject as viewed from a different respective viewing angle;

processing the plurality of enrollment images using machine-learning model to generate image features;

pooling the image features based on a mask indicative of at least one characteristic to generate characteristic features;

transforming the characteristic features based on the selected enrollment images to generate appearance features representing the at least one characteristic of the subject in the selected enrollment images;

combining the appearance features based on a three-dimensional geometry of the subject to generate combined appearance features; and generating an image of the subject from the target viewing angle based on a texture image of the subject and the combined appearance features.

10. The method of claim 9, wherein the selected enrollment images are selected based on a relationship between respective viewing angles of the selected enrollment images and the target viewing angle.

11. The method of claim 9, wherein the appearance features are generated by an appearance-code extractor.

12. The method of claim 9, wherein combining the appearance features comprises processing the appearance features using a machine-learning model to generate the combined appearance features.

13. The method of claim 9, wherein combining the appearance features comprises processing the appearance features and a mask indicative of the at least one characteristic using a machine-learning model to generate the combined appearance features.

14. The method of claim 9, wherein:
the subject is a head of a person; and
the at least one characteristic is hair of the person.

15. The method of claim 9, wherein:
the texture image of the subject comprises an image of the subject without the at least one characteristic from the target viewing angle; and
the generated image of the subject includes the at least one characteristic.

16. The method of claim 9, wherein the image of the subject is generated further based on normals of planes of the at least one characteristic.

17. A non-transitory computer-readable storage medium having stored thereon instructions that, when executed by at least one processor, cause the at least one processor to:
select enrollment images from among a plurality of enrollment images of a subject based on a target viewing angle, wherein each enrollment image of the plurality of enrollment images represents the subject as viewed from a different respective viewing angle;

process the plurality of enrollment images using machine-learning model to generate image features;

pool the image features based on a mask indicative of at least one characteristic to generate characteristic features;

transform the characteristic features based on the selected enrollment images to generate appearance features representing the at least one characteristic of the subject in the selected enrollment images;

combine the appearance features based on a three-dimensional geometry of the subject to generate combined appearance features; and generate an image of the subject from the target viewing angle based on a texture image of the subject and the combined appearance features.

18. The non-transitory computer-readable storage medium of claim 17, wherein the selected enrollment images are selected based on a relationship between respective viewing angles of the selected enrollment images and the target viewing angle.

* * * * *